US012592392B2

(12) United States Patent (10) Patent No.: US 12,592,392 B2

Pei et al. (45) Date of Patent: Mar. 31, 2026

(54) ELECTRODE, METHOD FOR PREPARING SAME, BATTERY AND ELECTRICAL APPARATUS

(71) Applicant: CONTEMPORARY AMPEREX TECHNOLOGY (HONG KONG) LIMITED, Hong Kong (CN)

(72) Inventors: Hang Pei, Ningde City (CN); Xiaoming Ge, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 166 days.

(21) Appl. No.: 18/328,756

(22) Filed: Jun. 4, 2023

(65) Prior Publication Data

US 2023/0307658 A1 Sep. 28, 2023

Related U.S. Application Data

(63) Continuation of application No. PCT/CN2021/119342, filed on Sep. 18, 2021.

(51) Int. Cl.
H01M 4/04 (2006.01)
H01M 4/66 (2006.01)
H01M 4/02 (2006.01)

(52) U.S. Cl.
CPC ......... H01M 4/668 (2013.01); H01M 4/0404 (2013.01); H01M 4/0428 (2013.01); H01M 4/043 (2013.01); H01M 4/661 (2013.01); H01M 4/667 (2013.01); *H01M 2004/021* (2013.01)

(58) Field of Classification Search
None
See application file for complete search history.

(56) References Cited

FOREIGN PATENT DOCUMENTS

| | | | |
|---|---|---|---|
| CN | 107369837 | A | 11/2017 |
| CN | 108682788 | A | 10/2018 |
| CN | 109449447 | A | 3/2019 |
| CN | 109830690 | A | 5/2019 |
| CN | 208923279 | U | 5/2019 |
| CN | 111180664 | A | 5/2020 |
| CN | 110661000 | B | 11/2020 |
| JP | H1197035 | A | 4/1999 |
| JP | 2000090936 | A | 3/2000 |
| JP | 2001118566 | A | 4/2001 |
| JP | 2005100804 | A * | 4/2005 |
| JP | 2006286218 | A | 10/2006 |
| JP | 2011165389 | A | 8/2011 |
| JP | 2012248282 | A | 12/2012 |

(Continued)

OTHER PUBLICATIONS

Notice of Reasons for Refusal received in the corresponding Japanese Application 2023-501834, mailed Feb. 20, 2024.

(Continued)

*Primary Examiner* — Tracy M Dove

(74) *Attorney, Agent, or Firm* — K&L Gates LLP

(57) ABSTRACT

An electrode, a method for preparing the same, a battery, and an electrical apparatus are provided. The electrode comprises a current collector layer having a porous structure and being gas permeable; and an active material layer laminated on at least part of surface of the current collector layer and located outside pores of the porous structure.

18 Claims, 6 Drawing Sheets

(56)        References Cited

FOREIGN PATENT DOCUMENTS

JP         2015079593  A      4/2015
JP         2019186195  A     10/2019

OTHER PUBLICATIONS

International Search Report received in the corresponding International Application PCT/CN2021/119342, mailed Jun. 16, 2022.
The extended European search report received in the corresponding European Application 21948706.3, mailed on Apr. 3, 2024.
Request for the Submission of an Opinion received in the counterpart Korean application 10-2023-7001435, mailed on Jan. 7, 2025.
Notice of Allowance (with English Machine Translation), mailed Oct. 13, 2025, for corresponding Korean Patent Application Serial No. 10-2023-7001435.

* cited by examiner

1000

100

721

710

715

721

710

711    712    715

ELECTRODE, METHOD FOR PREPARING SAME, BATTERY AND ELECTRICAL APPARATUS

CROSS REFERENCE TO RELATED APPLICATIONS

The present application is a continuation of International Application PCT/CN2021/119342, filed on Sep. 18, 2021 and entitled "ELECTRODE, METHOD FOR PREPARING SAME, BATTERY AND ELECTRICAL APPARATUS", the entire disclosure of which is incorporated herein by reference.

TECHNICAL FIELD

The present application relates to the field of batteries, and specifically relates to an electrode, a method for preparing the same, a battery, and an electrical apparatus.

BACKGROUND ART

Energy saving and emission reduction are the key to the sustainable development of the automobile industry. Electric vehicles have become an important constituent part of the sustainable development of the automobile industry due to their advantages of energy saving and environmental protection. For the electric vehicles, the battery technology is another important factor regarding their development.

During the use of the battery charge-discharge, a chemical reaction occurs due to the contact between an electrolyte solution and positive and negative electrodes, thereby generating a gas, and affecting the use of the battery.

SUMMARY OF THE INVENTION

In view of the above problems, the present application provides an electrode, a method for preparing the same, a battery, and an electrical apparatus, where the electrode has an improved gas permeability, thereby alleviating the expansion of the battery cell caused by gas generation during the use of the battery, and improving the comprehensive performance of the battery.

In a first aspect, the present application provides an electrode, including a current collector layer having a porous structure and being gas permeable; and an active material layer laminated on at least part of surface of the current collector layer and located outside pores of the porous structure.

In the technical solutions of examples of the present application, the current collector layer is gas permeable. When a gas is generated from a battery due to the contact between an electrolyte solution and positive and negative electrodes, such a design enables the gas to escape from a battery cell through the current collector layer, thereby avoiding the occurrence of deformation or structural failure inside the battery cell due to bloating, and improving the battery performance.

In some examples, a material of the current collector layer comprises a conductive material, such as a metal material, a carbon-based conductive material, a conductive high molecular material, or a combination thereof. With the conductive material, a current collector has a good conductivity.

In some examples, the current collector layer comprises a porous substrate and a conductive layer, and the conductive layer covers at least part of surface of the porous substrate.

The current collector in the example of the present application has a composite structure comprising the porous substrate and the conductive layer. The porous substrate functions for supporting the current collector structure, and the conductive layer functions for conducting electricity. The two have their own advantages and function synergistically, thus endowing the current collector layer with improved comprehensive performance.

In some examples, a conductivity of the conductive layer is greater than a conductivity of the porous substrate. Such a design enables the conductive layer to use a material of a high conductivity, and the porous substrate to use a material of a low conductivity, thereby reducing the use amount of the material of a high conductivity, and reducing the costs without substantially affecting the surface conductivity of the current collector, and without affecting the electron transport at an interface between the current collector and the active material.

In some examples, a density of the porous substrate is less than a density of the conductive layer. Such a design enables the conductive layer to use a material of a high conductivity (e.g., a metal material), and the porous substrate to use a material of a low density (e.g., a high molecular material), thereby reducing the overall density of the current collector layer without substantially affecting the surface conductivity of the current collector, and without affecting the electron transport at the interface between the current collector and the active material.

In some examples, a material of the porous substrate includes a polymer. Optionally, the polymer is selected from one or more of polyamide, polyimide, polyester, polyolefin, polyyne, siloxane polymer, polyether, polyol, polysulfone, polysaccharide polymer, amino acid polymer, polythiazyl, aromatic ring polymer, heteroaromatic ring polymer, epoxy resin, phenolic resin, derivative thereof, cross-link thereof, copolymer thereof, or a combination thereof. Such a design can reduce the overall density of the current collector layer.

In some examples, a material of the conductive layer includes a metal. Optionally, the metal is selected from the group consisting of aluminum, copper, nickel, iron, titanium, silver, nickel, or an alloy of any one thereof. Such a design can improve the conductivity of the current collector layer.

In some examples, a porosity of the current collector layer is 20% or more, for example, from 20% to 95%. When the porosity of the current collector layer is from 20% to 95%, the electrode not only has a good gas permeability, but also has good structural strength and stability.

In some examples, a thickness of the current collector layer is 4 μm or more, for example, from 4 μm to 500 μm. The thickness of the current collector layer is set as 4 μm or more, such that the current collector has good structural strength and stability. The thickness of the current collector layer is set as from 4 μm to 500 μm, such that the electrode not only has good structural strength and stability, but also has low weight and volume ratios in the battery, and then the battery has a high volumetric energy density or gravimetric energy density.

In some examples, a gas permeability of the current collector layer is from 1,000 to 5,000 cm$^3$/m$^2$·24 h·0.1 Mpa (e.g., from 1,000 to 2,000 cm$^3$/m$^2$·24 h·0.1 Mpa, from 2,000 to 3,000 cm$^3$/m$^2$·24 h·0.1 Mpa, from 3,000 to 4,000 cm$^3$/m$^2$·24 h·0.1 Mpa, or from 4,000 to 5,000 cm$^3$/m$^2$·24 h·0.1 Mpa). With this design, the current collector electrode has a high gas permeability, thereby contributing to gas emission. GB/T1038-2000 Plastics-Film and sheeting-Determination of gas transmission-Differential-pressure method may be referred to for the test standard.

In some examples, a tortuosity of the current collector layer is 1 or more, e.g., from 1.0 to 6.0 (e.g., 1.0-2.0, 2.0-3.0, 3.0-4.0, 4.0-5.0, or 5.0-6.0). With this design, the electrode is easily infiltrated by the electrolyte solution, and the electrolyte solution easily climbs along the electrode. Bruggeman formula is used as the test standard for the tortuosity: $\tau=\varepsilon^{\alpha}$, where $\tau$ is the tortuosity, $\varepsilon$ is the porosity, and a is a Bruggeman coefficient ($-1 \leq \alpha \leq -0.5$).

In some examples, the electrode further comprises an electrical connection member (e.g., a tab). The electrical connection member is mounted on the current collector layer, and is electrically connected to the current collector layer. In this solution, the electrical connection member is a member configured to conduct an electrode current.

In some examples, at least one side surface of the porous substrate comprises at least one edge region, and the conductive layer covers a region outside the edge region. In this solution, the edge region is not covered by the conductive layer, and the edge region is partially non-conductive. The edge region is partially not covered by the active material layer. The edge region prevents the active material layer from direct contact with an end cap of the battery, and can function for protecting the active material layer. In addition, since the tab is usually installed at an edge of the current collector layer, the non-conductive edge region not only protects the tab, but also prevents the tab from occurrence of short circuit because of contacting the opposite electrode.

In some examples, the surface of the current collector layer comprises an active material region and a support region; the active material layer is laminated on the active material region of the current collector layer; and the electrode further comprises a support layer laminated on the support region of the surface. In some examples, a material of the support layer comprises porcelain (e.g., a coating comprising porcelain particles). In this solution, the support layer has a structural strengthening effect. Such a design can improve the structural strength and structural stability of the electrode.

In some examples, the active material layer comprises an electrochemically active material; where, optionally, the electrochemically active material is selected from a positive electrode active material of a lithium ion battery or a negative electrode active material of the lithium ion battery; optionally, the positive electrode active material of the lithium ion battery is selected from the group consisting of an olivine-structured lithium-containing phosphate, a lithium transition metal oxide, or a combination thereof; and optionally, the negative electrode active material of the lithium ion battery is selected from the group consisting of artificial graphite, natural graphite, soft carbon, hard carbon, silicon-based material, tin-based material, lithium titanate, lithium metal, or a combination thereof. In this solution, the electrode of the present application can be used in combination with various electrochemically active materials.

In a second aspect, the present application provides a method for preparing an electrode, including: providing a current collector layer having a porous structure and being gas permeable; providing an active material layer; and laminating the active material layer on at least part of surface of the current collector layer, such that the active material layer is located outside pores of the porous structure. The electrode obtained using this method has an improved gas permeability.

In some examples, the method for preparing an electrode includes a step of preparing the current collector layer, the step including: providing a porous substrate; and depositing a conductive layer on at least part of surface of the porous substrate; where, optionally, the deposition is selected from the group consisting of electroplating, chemical plating, evaporation, magnetron sputtering, or a combination thereof. The electrode obtained using this method has an improved gas permeability.

In some examples, a conductivity of the porous substrate is less than a conductivity of the conductive layer. The electrode obtained using this method has an improved conductivity.

In some examples, the density of the porous substrate is less than the density of the conductive layer. The electrode obtained using this method has a reduced density.

In a third aspect, the present application provides a battery, comprising the electrode in the above examples or the electrode prepared using the method in the above examples.

In a fourth aspect, the present application provides an electrical apparatus, comprising the battery in the above examples, where the battery is configured to provide electric energy.

The above description merely provides an overview of the technical solutions of the present application. In order to more clearly understand the technical means of the present application, the present application may be implemented according to the content of the specification, and in order to make the above and other objectives, features, and advantages of the present application more obvious and understandable, specific embodiments of the present application are listed below.

DESCRIPTION OF DRAWINGS

By reading the detailed description of the preferred implementations below, various other advantages and benefits will become apparent to those of ordinary skill in the art. The drawings are merely used to show preferred implementations, and are not considered to impose any limitation on the present application. Moreover, in all of the drawings, the same parts are indicated by the same reference numerals. In the figures.

Figure 1:
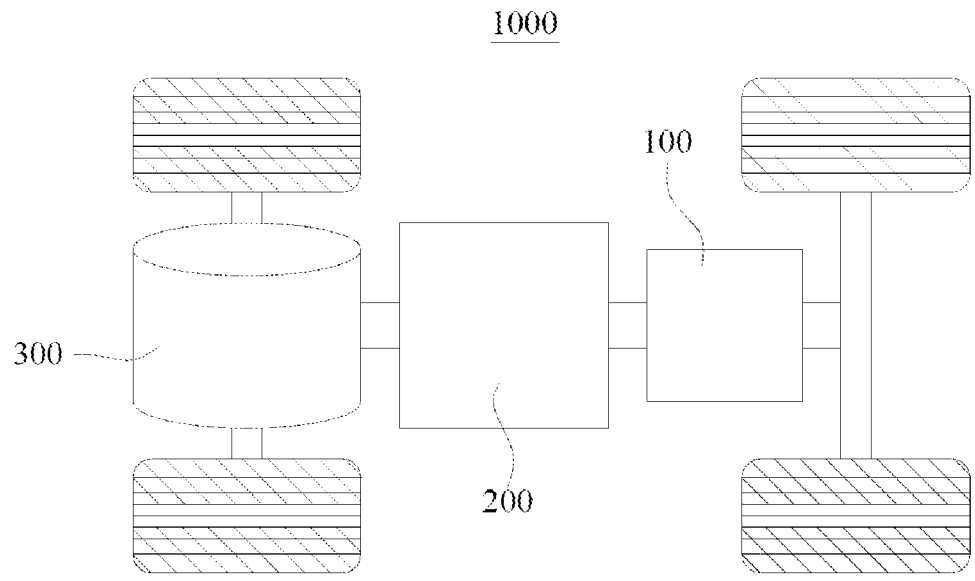
FIG. 1 is a schematic structural diagram of a vehicle in some examples of the present application.

Reference numerals in the Detailed Description are as follows:

vehicle 1000;

battery 100, controller 200, motor 300;

box body 10, first portion 11, second portion 12; battery cell 20;

case 21; electrode assembly 22; first electrode sheet 221; second electrode sheet 222; separator 223; 2 flat surfaces 224; adapter sheet 23; cover plate assembly 24; cover plate 241 first electrode terminal 242; second electrode terminal 243;

current collector layer 710, porous substrate 711, conductive layer 712, edge region 713, porous structure 715, first active material layer 721, second active material layer 722, support layer 730;

electrical connection member 810, and connection region 815.

DETAILED DESCRIPTION

Examples of the technical solutions of the present application will be described in detail below with reference to the accompanying drawings. The following examples are only used to more clearly illustrate the technical solution of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application; the terms used herein are intended only for the purpose of describing specific examples and are not intended to limit the present application; the terms "including" and "having" and any variations thereof in the specification and the claims of the present application and in the description of drawings above are intended to cover non-exclusive inclusion.

In the description of the examples of the present application, the technical terms such as "first" and "second" are only used for distinguishing between different objects, and cannot be understood as indicating or implying relative importance or implicitly indicating the number, specific order, or primary-secondary relationship of indicated technical features. In the description of the examples of the present application, the "plurality" means more than two, unless otherwise specifically defined.

Reference herein to an "example" means that a particular feature, structure, or characteristic described with reference to the example may be included in at least one example of the present application. The appearances of the phrase in various places in the specification neither necessarily refer to the same example, nor are independent or alternative examples mutually exclusive with other examples. It is explicitly and implicitly understood by those skilled in the art that the examples described herein may be combined with other examples.

In the description of the examples of the present application, the term "and/or" is only an association relationship for describing associated objects, indicating that three relationships may exist. For example, A and/or B may represent three situations: A exists alone, both A and B exist, and B exists alone. In addition, the character "/" herein generally means that the associated objects before and after it are in an "or" relationship.

In the description of the examples of the present application, the term "plurality" refers to more than two (including two). Similarly, "a plurality of groups" refers to more than two groups (including two groups), and "a plurality of sheets" refers to more than two sheets (including two sheets).

In the description of the examples of the present application, the orientation or location relationships indicated by the technical terms "center", "longitudinal", "transverse", "length", "width", "thickness", "up", "down", "front", "back", "left", "right", "vertical", "horizontal", "top", "bottom", "inside", "outside", "clockwise", "counterclockwise", "axial", "radial", "circumferential" and the like are based on the orientation or location relationships shown in the drawings, and are only for convenience and simplification of the description of the examples of the present application, but do not indicate or imply that the apparatuses or elements referred to must have particular orientations, be constructed and operated in particular orientations, and therefore cannot be construed as a limitation of the examples of the present application.

In the description of the examples of the present application, unless otherwise expressly specified and limited, the technical terms "mounting," "connected," "connecting," "fixing", and the like shall be understood in a broad sense, which, for example, may be a fixed connection, or a detachable connection or an integral connection; may also be a mechanical connection, or an electrical connection; may be a direct connection, or an indirect connection through an intermediate medium, and may be a communication within two elements or an interactive relationship between two elements. For those of ordinary skills in the art, the specific meanings of the above terms in the examples of the present application may be understood according to specific circumstances.

At present, from the perspective of the development of the market situation, power batteries are increasingly widely applied. Power batteries are not only applied in energy storage power systems such as water, fire, wind and solar power stations, but also widely applied in electric transport tools, such as electric bicycles, electric motorcycles, and electric vehicles, as well as many fields, such as military equipment and aerospace. With the continuous expansion of the application field of the power batteries, the market demand is also constantly expanding.

A battery cell of a battery generally includes a laminate formed by laminating a multi-layer electrode or a winding body formed by winding a multi-layer electrode. The present inventor notices that during the charge-discharge cycle of the battery, a gas may be generated near the electrodes due to occurrence of a side reaction (such as oxygenolysis of the electrolyte solution). If the generated gas is not emitted from the laminate or the winding body of the multi-layer electrode in time, a very high local gas pressure inside the battery cell may be caused, which may then cause the expansion and deformation of the battery cell, and may then have adverse effects on the performance and service life of the battery. For example, the expansion and deformation of the battery cell may lead to an increase of a distance between some electrodes, thereby resulting in loss of the battery capacity.

Based on the above considerations, in order to solve the problem of expansion and deformation of the battery cell caused by gas generation in a side reaction arising near the electrodes, the inventor designs an electrode after in-depth study. The electrode comprises a current collector layer and an active material layer, where the current collector layer has a porous structure and is gas permeable; and the active material layer is laminated on at least part of surface of the current collector layer and is located outside pores of the porous structure.

In such a battery cell, due to the porous structure of the current collector layer, the current collector layer is gas permeable, and can effectively emit the gas generated near the electrodes, thereby avoiding the bloating of the battery cell caused by the obstruction of gas emission, and avoiding the expansion and deformation of the battery cell.

The battery cell disclosed in the examples of the present application may be used in, but is not limited to, electrical apparatuses, such as a vehicle, a ship, or an aircraft. A power system, such as a battery cell or a battery disclosed in the present application, constituting the electrical apparatus may be used, thereby contributing to alleviating and automatically adjusting the deterioration of the expansion force of the battery cell, supplementing for the consumption of the electrolyte solution, and improving the stability of the battery performance and the service life of the battery.

Examples of the present application provide an electrical apparatus using a battery as a power source. The electrical apparatus may be, but is not limited to, a mobile phone, a tablet computer, a laptop, an electric toy, an electric tool, a battery car, an electric vehicle, a ship, a spacecraft, and the like. The electric toy may include a stationary or mobile electric toy, such as a game machine, an electric vehicle toy, an electric ship toy, or an electric airplane toy, and the spacecraft may include an airplane, a rocket, an aerospace plane, a spaceship, and the like.

For ease of description, the following examples are illustrated by taking an electrical apparatus in an example of the present application being a vehicle 1000 as an example.

Referring to FIG. 1, FIG. 1 is a schematic structural diagram of a vehicle 1000 provided in some examples of the present application. The vehicle 1000 may be a fuel vehicle, a gas vehicle, or a new energy vehicle. The new energy vehicle may be a all-electric vehicle, a hybrid vehicle, or a range extended electric vehicle. The interior of the vehicle 1000 is provided with a battery 100, which can be provided at the bottom or head or tail of the vehicle 1000. The battery 100 can be used to power the vehicle 1000, for example, the battery 100 can serve as an operating power source for the vehicle 1000. The vehicle 1000 may further include a controller 200 and a motor 300, wherein the controller 200 is used to control the battery 100 to power the motor 300, for example, for the operating power demand when the vehicle 1000 is starting, navigating and driving.

In some examples of the present application, the battery 100 can not only serve as an operating power source of the vehicle 1000, but also serve as a driving power source of the vehicle 1000, to provide driving power for the vehicle 1000 in place of or partially in place of fuel or natural gas.

Figure 2:
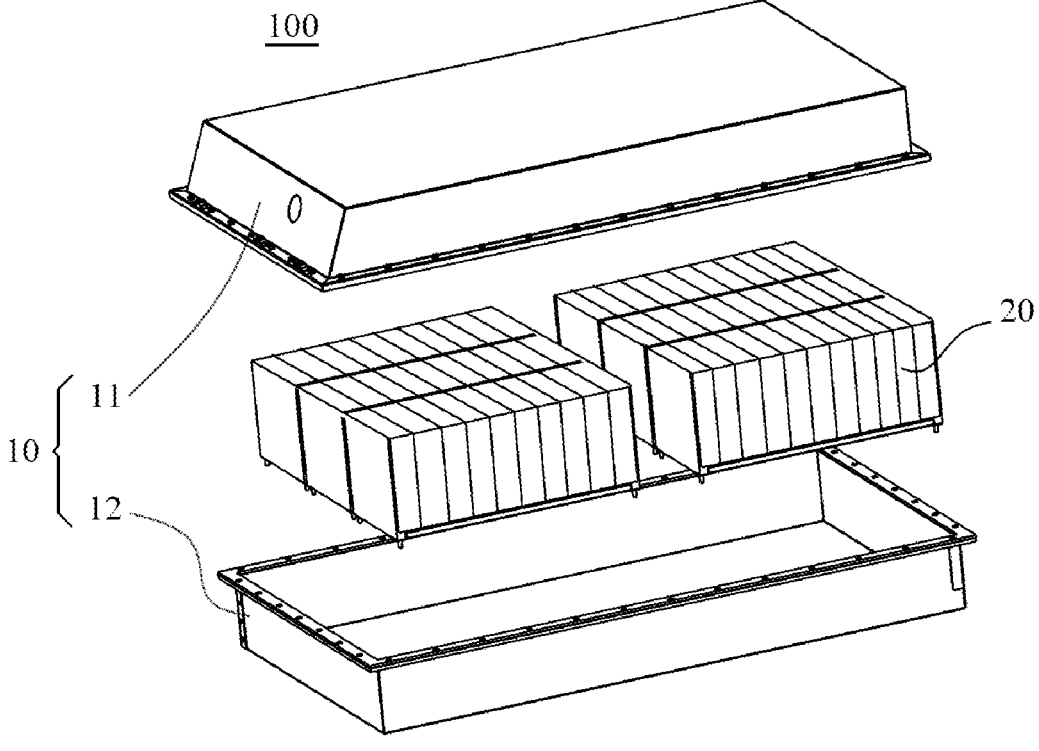
FIG. 2 is a schematic diagram of a detailed structure of a battery in some examples of the present application.

Referring to FIG. 2, FIG. 2 is an exploded view of a battery 100 provided in some examples of the present application. The battery 100 includes a box body 10 and a battery cell 20, where the battery cell 20 is accommodated within the box body 10. The box body 10 is configured to provide an accommodating space for the battery cell 20, and the box body 10 may adopt various structures. In some examples, the box body 10 may include a first portion 11 and a second portion 12. The first portion 11 and the second portion 12 are mutually covered, such that the first portion 11 and the second portion 12 together define an accommodating space for accommodating the battery cell 20. The second portion 12 may be a hollow structure with one opening end, the first portion 11 may be a plate-like structure, and the first portion 11 is covered on the opening side of the second portion 12, such that the first portion 11 and the second portion 12 together define an accommodating space; or the first portion 11 and the second portion 12 each may be a hollow structure with one opening side, and the opening side of the first portion 11 is covered on the opening side of the second portion 12. Of course, the box body 10 formed by the first portion 11 and the second portion 12 may be of various shapes, such as a cylinder and a cuboid.

In the battery 100, there may be a plurality of battery cells 20, and there may be a series connection, or a parallel connection, or a hybrid connection between the plurality of battery cells 20. The hybrid connection means that there may be both the series connection and the parallel connection between the plurality of battery cells 20. The plurality of battery cells 20 can be directly connected in series or parallel or in mixed connection together, and then the whole of the plurality of battery cells 20 is accommodated within the box body 10; of course, the battery 100 may also be such that a plurality of battery cells 20 are first connected in series or parallel or in mixed connection to form a battery module, and a plurality of battery modules are connected in series or parallel or in mixed connection to form a whole and is accommodated within the box body 10. The battery 100 may further include other structures. For example, the battery 100 may further include a bus component configured to implement an electrical connection between the plurality of battery cells 20.

Each of the battery cells 20 may be a secondary battery or a primary battery; or may be, but is not limited to, a lithium-sulfur battery, a sodium ion battery, or a magnesium ion battery. The battery cell 20 may present a cylindrical, flat, cuboid, or other shapes.

Figure 3:
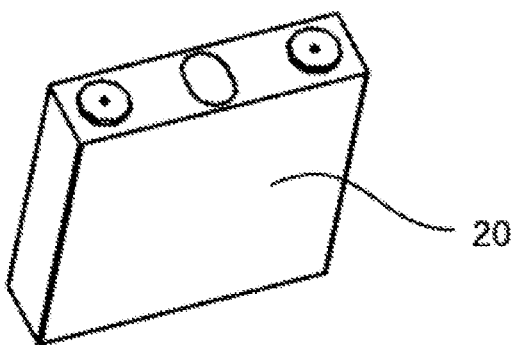
FIG. 3 is a schematic diagram of a battery cell in some examples of the present application.
Figure 4:
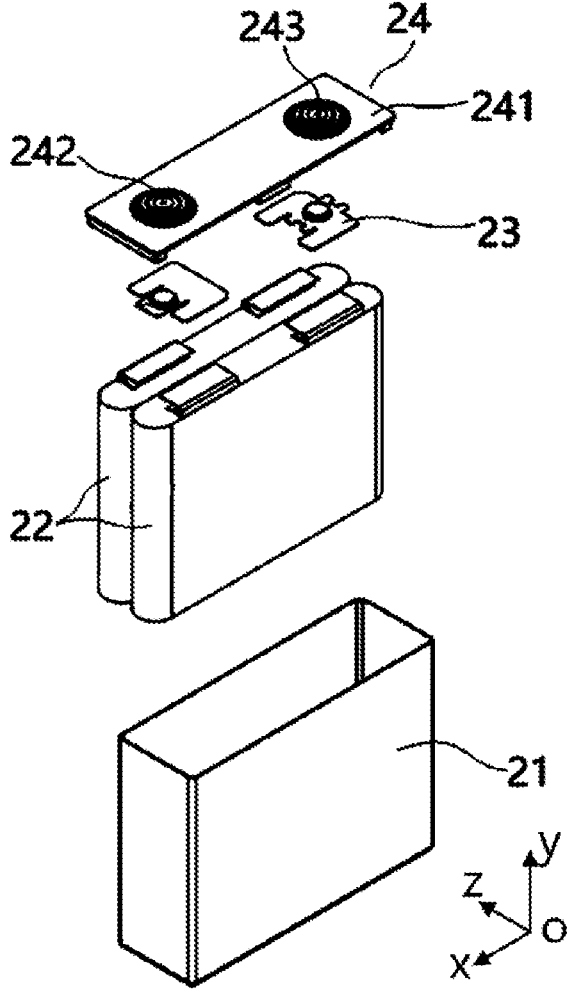
FIG. 4 is a schematic exploded view of the battery cell in some examples of the present application.

FIG. 3 is a schematic structural diagram of a single battery cell, and FIG. 4 is a schematic exploded view of a single battery cell. Each battery cell 20 includes: a case 21 and an electrode assembly 22 arranged within the case 21. The case 21 may have a hexahedral shape or other shapes, and have an opening. The electrode assembly 22 is accommodated within the case 21. The opening of the case 21 is covered with a cover plate assembly 24. The cover plate assembly 24 includes a cover plate 241 and two electrode terminals arranged on the cover plate. The two electrode terminals are a first electrode terminal 242 and a second electrode terminal 243, respectively. The first electrode terminal 242 may be a positive electrode terminal, and the second electrode terminal 243 may be a negative electrode terminal. In other examples, the first electrode terminal 242 may also be a negative electrode terminal, and the second electrode terminal 243 may be a positive electrode terminal. An adapter sheet 23 is provided between the cover plate assembly 24 and the electrode assembly 22, and a tab of the electrode assembly 22 is electrically connected to the electrode terminals on the cover plate 241 through the adapter sheet 23. In the present example, there are two adapter sheets 23, namely, a positive electrode adapter sheet and a negative electrode adapter sheet, respectively.

As shown in FIG. 4, two electrode assemblies 22 are arranged within the case 21, and the two electrode assemblies 22 are stacked along a height direction (z direction) of the battery cell 2, where the height direction of the battery cell 2 is consistent with a height direction of a battery pack. Of course, in other examples, one electrode assembly 22 may also be arranged within the case 21, or more than three electrode assemblies 22 may be arranged within the case 21.

The plurality of electrode assemblies 22 are stacked along the height direction (z direction) of the battery cell 2.

Figure 5:
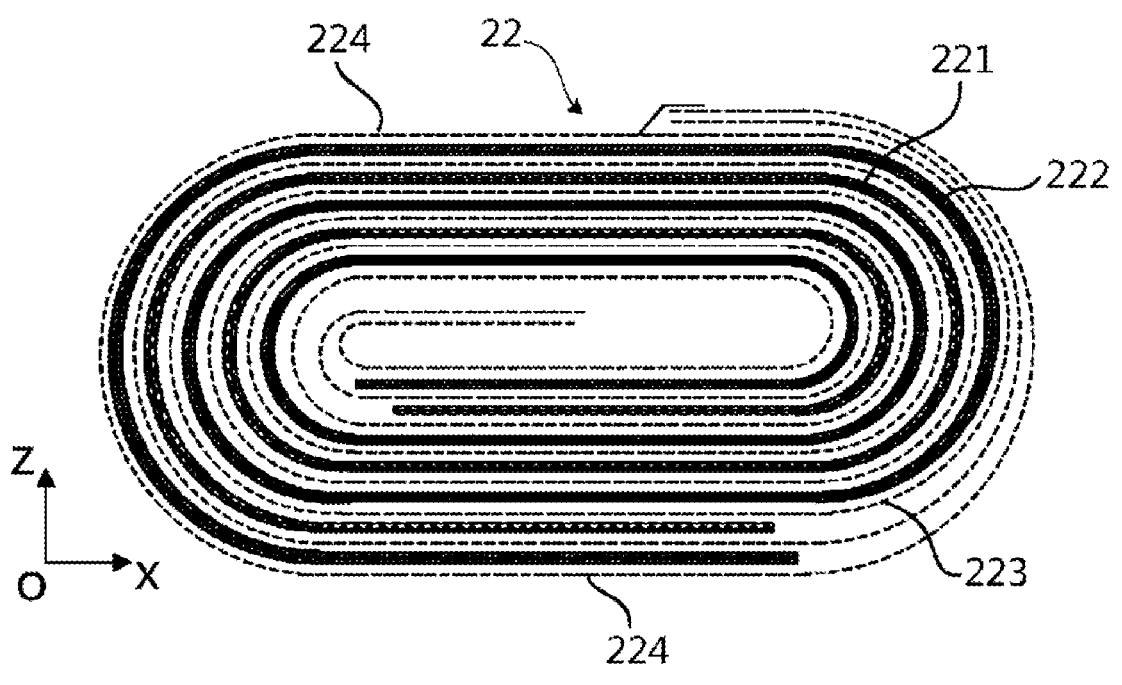
FIG. 5 is a sectional view of a winding electrode assembly used in the battery cell along an xz plane in FIG. 4 in some examples of the present application.
Figure 6:
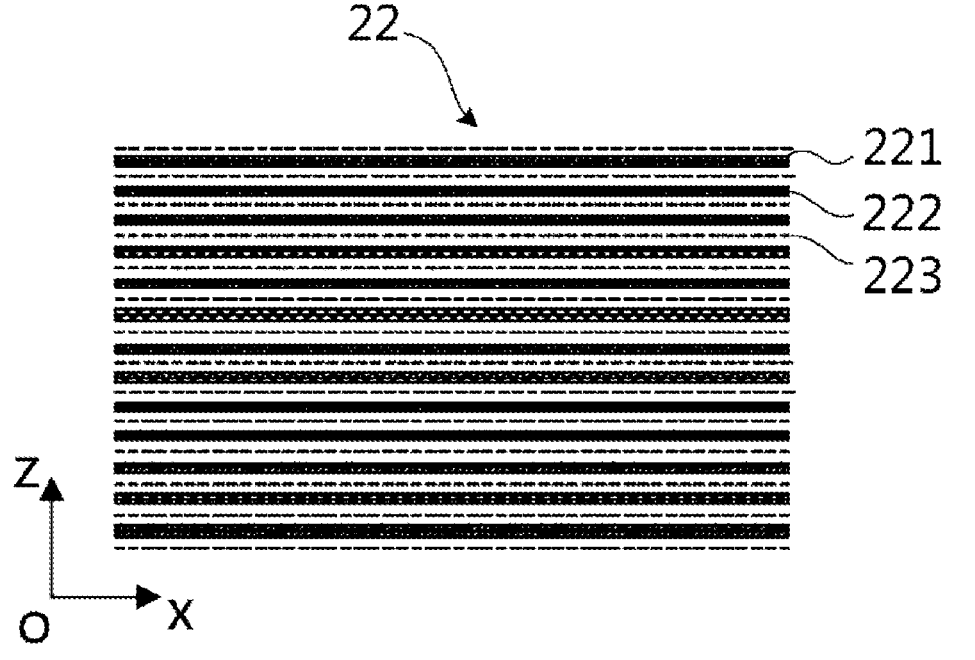
FIG. 6 is a sectional view of a laminated electrode assembly along the xz plane in FIG. 4 in some examples of the present application.

As shown in FIG. 5 and FIG. 6, the electrode assembly 22 includes a first electrode 221, a second electrode 222, and a separator 223 arranged between the first electrode 221 and the second electrode 222. The first electrode 221 may be a positive electrode, and the second electrode 222 may be a negative electrode. In other examples, the first electrode 221 may also be a negative electrode, and the second electrode 222 may be a positive electrode. The separator 223 is an insulator between the first electrode 221 and the second electrode 222. The active material of the positive electrode may be coated on a coating region of the positive electrode, and the active material of the negative electrode may be coated on a coating region of the negative electrode. A portion extending from the coating region of the positive electrode is used as a positive electrode tab; and a portion extending from the coating region of the negative electrode is used as a negative electrode tab. The positive electrode tab is connected to a positive electrode terminal on the cover plate assembly 24 through a positive electrode adapter sheet, and similarly, the negative electrode tab is connected to a negative electrode terminal on the cover plate assembly 24 through a negative electrode adapter sheet.

Figure 8:
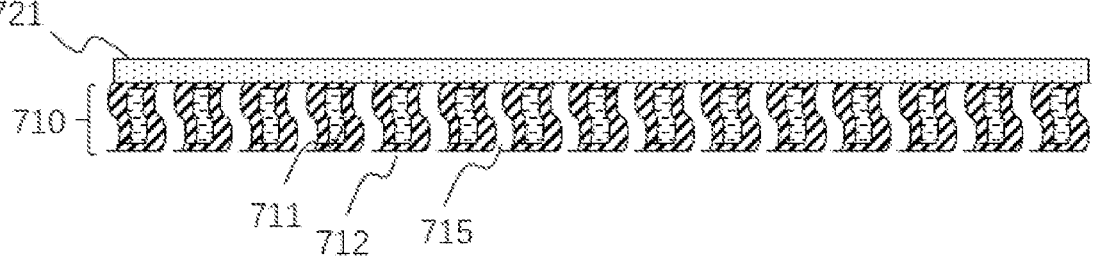
FIG. 8 is a sectional view of the electrode in some other examples of the present application.

As shown in FIG. 5, the electrode assembly 22 is a winding structure. The first electrode 221, the separator 223, and the second electrode 222 each have a strip-shaped structure. The first electrode 221, the separator 223, and the second electrode 222 are successively laminated, and are wound for more than two circles to form the electrode assembly 22. The electrode assembly 22 presents a flat shape. When the electrode assembly 22 is fabricated, the electrode assembly 22 may be directly wound into the flat shape, or may be first wound into a hollow cylindrical structure, and then flattened into the flat shape after being wound. FIG. 8 is a schematic diagram of an outline of the electrode assembly 22. An outer surface of the electrode assembly 22 includes two flat surfaces 224, where the two flat surfaces 224 are oppositely arranged along a height direction (z direction) of the battery cell 2. The electrode assembly 22 has a substantially hexahedral structure, and the flat surface 224 is substantially parallel to the winding axis and is an outer surface with a largest area. The flat surface 224 may be a relatively smooth surface, and is not required to be a pure plane.

As shown in FIG. 6, the electrode assembly 22 has a laminated structure, i.e., the electrode assembly 22 includes a plurality of first electrodes 221 and a plurality of second electrodes 222, and the separator 223 is arranged between the first electrodes 221 and the second electrodes 222. The first electrodes 221 and the second electrodes 222 are laminated along the height direction (z direction) of the battery cell 2.

Figure 7:
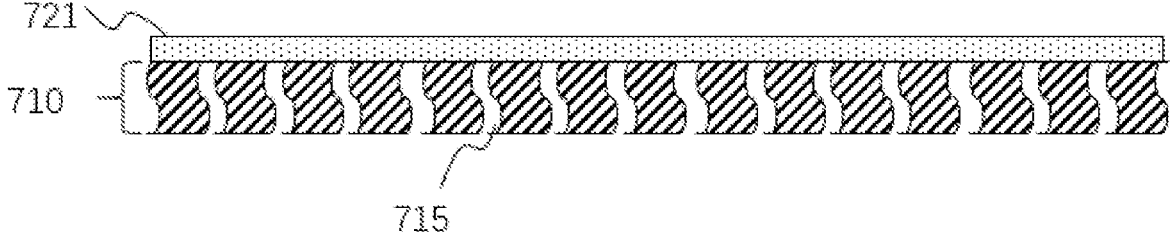
FIG. 7 is a sectional view of an electrode in some examples of the present application.

According to some examples of the present application, referring to FIG. 7, the present application provides an electrode, including a current collector layer 710 and a first active material layer 721. The current collector layer 710 has a porous structure 715 and is gas permeable. The first active material layer 721 is laminated on at least part of surface of the current collector layer 710, and the first active material layer 721 is located outside pores of the porous structure 715.

The current collector layer 710 refers, for example, to any conductive substrate capable of carrying current to and from the active material layer.

The porous structure 715 refers, for example, to a porous channel leading from one side to the other side of the current collector layer 710. The porous structure is, for example, a through hole structure, such as a three-dimensional network structure.

The "gas permeable" refers to having a higher gas permeability than a metal foil (such as a copper foil with a thickness of 4-8 μm).

The first active material layer 721 refers to a layer comprising an electrochemically active material. The electrochemically active material may be a positive electrode active material or a negative electrode active material.

A negative electrode active material for a battery well-known in the art may be used as the negative electrode active material. As an example, the negative electrode active material may include at least one of the following materials: artificial graphite, natural graphite, soft carbon, hard carbon, silicon-based material, tin-based material, lithium titanate, and the like. The silicon-based material may be at least one selected from the group consisting of elementary silicon, silicon-oxygen compound, silicon-carbon composite, silicon-nitrogen composite, and silicon alloy. The tin-based material may be at least one selected from the group consisting of elementary tin, tin-oxygen compound, and tin alloy. However, the present application is not limited to these materials, and other conventional materials useful as negative electrode active materials for batteries can also be used. These negative electrode active materials may be used alone or in combination of two or more.

A positive electrode active material for a battery well-known in the art may be used as the positive electrode active material. As an example, the positive electrode active material for a battery well-known in the art may be used as the positive electrode active material. As an example, the positive electrode active material may comprise at least one of the following materials: an olivine-structured lithium-containing phosphate, a lithium transition metal oxide, and respective modified compounds thereof. However, the present application is not limited to these materials, and other conventional materials useful as positive electrode active materials for batteries can also be used. These positive electrode active materials may be used alone or in combination of two or more. Examples of lithium transition metal oxides may include, but are not limited to, at least one of a lithium-cobalt oxide (e.g., $LiCoO_2$), a lithium-nickel oxide (e.g., $LiNiO_2$), a lithium-manganese oxide (e.g., $LiMnO_2$ or $LiMn_2O_4$), a lithium-nickel-cobalt oxide, a lithium-manganese-cobalt oxide, a lithium-nickel-manganese oxide, a lithium-nickel-cobalt-manganese oxide (e.g., $LiNi_{1/3}Co_{1/3}Mn_{1/3}O_2$ (or NCM333 for short), $LiNi_{0.5}Co_{0.2}Mn_{0.3}O_2$ (or NCM523 for short), $LiNi_{0.5}Co_{0.25}Mn_{0.25}O_2$ (or $NCM_{211}$ for short), $LiNi_{0.6}Co_{0.2}Mn_{0.2}O_2$ (or $NCM_{622}$ for short), $LiNi_{0.8}Co_{0.1}Mn_{0.1}O_2$ (or $NCM_{811}$ for short)), a lithium-nickel-cobalt-aluminum oxide (e.g., $LiNi_{0.85}Co_{0.15}Al_{0.05}O_2$), and modified oxides thereof. Examples of olivine-structured lithium-containing phosphates may include, but are not limited to, at least one of lithium iron phosphate (e.g., $LiFePO_4$ (or LFP for short)), lithium iron phosphate and carbon composite, lithium manganese phosphate (e.g., $LiMnPO_4$), lithium manganese phosphate and carbon composite, lithium manganese iron phosphate, and lithium manganese iron phosphate and carbon composite.

The active material layer optionally comprises a binder. The binder may be at least one selected from the group consisting of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

In the technical solutions of examples of the present application, the current collector layer is gas permeable. Further, the active material layers are all located outside the pores of the porous structure without entering the porous structure of the current collector layer, and will not block the porous structure, thereby enhancing the gas permeability of the current collector layer. When a gas is generated from a battery due to the contact between an electrolyte solution and positive and negative electrodes, such a design enables the gas to escape from a battery cell through the current collector layer, thereby avoiding the occurrence of deformation or structural failure inside the battery cell due to bloating, and improving the battery performance.

In some examples, the current collector layer is both gas permeable and liquid permeable. In this solution, a current collector is not only gas permeable, thus having improved gas emission performance, but also is electrolyte solution permeable, thus shortening the infiltration duration of the electrolyte solution on the electrode material layer, and improving the infiltration effects of the electrolyte solution on the electrode material layer.

In some examples, a material of the current collector layer comprises a conductive material, such as a metal material, a carbon-based conductive material, a conductive high molecular material, or a combination thereof. With the conductive material, the current collector has a good conductivity.

The conductive material is, for example, a material having a conductivity of 10 Siemens/meter (S/m) or more, for example, 103 Siemens/meter (S/m) or more, for example, 106 Siemens/meter (S/m) or more. The metal material is, for example, aluminum, copper, nickel, iron, titanium, silver, nickel, or an alloy of any one thereof. The carbon-based conductive material is, for example, graphite, carbon fiber, carbon nanotube, or graphene. The conductive high molecular material is, for example, polypyrrole, polythiophene, or polyphenylacetylene.

In some examples of the present application, referring to FIG. 8, the current collector layer 710 comprises a porous substrate 711 and a conductive layer 712, where the conductive layer 712 covers at least part of surface of the porous substrate 711. The current collector in the example of the present application has a composite structure comprising the porous substrate 711 and the conductive layer 712. The porous substrate 711 functions for supporting the current collector structure, and the conductive layer 712 functions for conducting electricity. The two have their own advantages and function synergistically, thus endowing the current collector layer with improved comprehensive performance.

In the above solution, the porous substrate 711 has a porous structure, i.e., has a porous channel leading from one side to the other side. The porous substrate is, for example, a substrate having a through hole structure, e.g., a substrate having a three-dimensional network structure. The porous substrate 711 may be made of a non-conductive material.

In some examples, the conductive layer 712 covers inner surfaces of pores of the porous substrate, the pore structure of the covered porous substrate is still retained, and the current collector layer 710 has a porous structure 715.

In some examples, the conductive layer 712 covers outer surfaces and inner surfaces of the pores of the porous substrate. Such a design enables all surfaces of the porous substrate to have an improved conductivity.

In some examples, a conductivity of the conductive layer 712 is greater than a conductivity of the porous substrate 711. Such a design enables the conductive layer 712 to use a material of a high conductivity, and the porous substrate 711 to use a material of a low conductivity, thereby reducing the use amount of the material of a high conductivity, and reducing the costs without substantially affecting the surface conductivity of the current collector, and without affecting the electron transport at an interface between the current collector and the active material.

In some examples, a density of the porous substrate 711 is less than a density of the conductive layer 712. Such a design enables the conductive layer 712 to use a material of a high conductivity (such as a metal material), and the porous substrate 711 to use a material of a low density (such as a high molecular material), thereby reducing the overall density of the current collector layer 710 without substantially affecting the surface conductivity of the current collector layer 710, and without affecting the electron transport at an interface between the current collector layer 710 and the active material layer 721.

In some examples, a material of the porous substrate 711 includes a polymer. Optionally, the polymer is selected from one or more of polyamide, polyimide, polyester, polyolefin, polyyne, siloxane polymer, polyether, polyol, polysulfone, polysaccharide polymer, amino acid polymer, polythiazyl, aromatic ring polymer, heteroaromatic ring polymer, epoxy resin, phenolic resin, derivative thereof, cross-link thereof, copolymer thereof, or a combination thereof. Such a design can reduce the overall density of the current collector layer.

In some examples, a material of the conductive layer 712 includes a metal. Optionally, the metal is selected from the group consisting of aluminum, copper, nickel, iron, titanium, silver, nickel, or an alloy of any one thereof. Such a design can improve the conductivity of the current collector layer.

In some examples, a porosity of the current collector layer 710 is 20% or more, for example, from 20% to 95%. When the porosity of the current collector layer is from 20% to 95%, the electrode not only has a good gas permeability, but also has good structural strength and stability. The porosity of the current collector layer 710 is 20%-30%, 30%-40%, 40%-50%, 50%-60%, 60%-70%, 70%-80%, 80%-90%, or 90%-95%. The porosity of the current collector layer may be measured in accordance with the standard GB/T 33052-2016 Microporous functional membrane-Measurement for Porosity-Absorption method by cetane.

In some examples, a thickness of the current collector layer 710 is 4 μm or more, for example, from 4 μm to 500 μm. The thickness of the current collector layer is set as 4 μm or more, such that the current collector has good structural strength and stability. The thickness of the current collector layer is set as from 4 μm to 500 μm, such that the electrode not only has good structural strength and stability, but also has low weight and volume ratios in the battery, and then the battery has a high volumetric energy density or gravimetric energy density.

In some examples, a gas permeability of the current collector layer 710 is from 1,000 to 5,000 $cm^3/m^2 \cdot 24 \, h \cdot 0.1$ MPa. With this design, the current collector electrode has a high gas permeability, thereby contributing to gas emission. GB/T1038-2000 Plastics-Film and sheeting-Determination of gas transmission-Differential-pressure method may be referred to for the test standard.

In some examples, a tortuosity of the current collector layer 710 is 1 or more, e.g., from 1.0 to 6.0 (e.g., 1.0-2.0, 2.0-3.0, 3.0-4.0, 4.0-5.0, or 5.0-6.0). With this design, the electrode is easily infiltrated by the electrolyte solution, and the electrolyte solution easily climbs along the electrode. Bruggeman formula is used as the test standard for the tortuosity: $\tau=\varepsilon^\alpha$, where $\tau$ is the tortuosity, $\varepsilon$ is the porosity, and a is a Bruggeman coefficient ($-1\leq\alpha\leq-0.5$).

Figure 9:
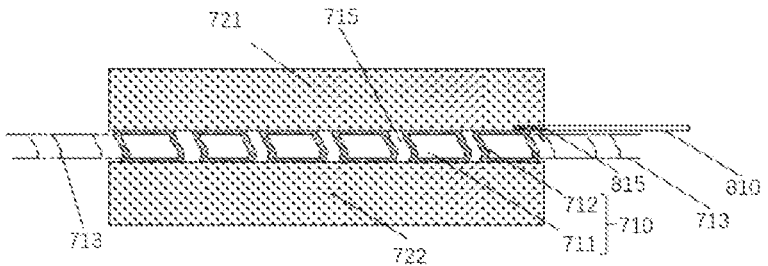
FIG. 9 is a sectional view of the electrode in some other examples of the present application.

In some examples, FIG. 9 shows a sectional view of the electrode in some examples. As shown in FIG. 9, the electrode includes a current collector layer 710. The current collector layer 710 has a porous structure 715, and is gas permeable. The electrode further includes a first active material layer 721 and a second active material layer 722, the first active material layer 721 and the second active material layer 722 are laminated on both side surfaces of the current collector layer 710 respectively, and the first active material layer 721 and the second active material layer 722 are located outside pores of the porous structure 715. The current collector layer 710 comprises a porous substrate 711 and a conductive layer 712, and the conductive layer 712 covers at least part of surface of the porous substrate 711.

In some examples, as shown in FIG. 9, the electrode further comprises an electrical connection member 810 (e.g., a tab). The electrical connection member 810 is mounted on the current collector layer 710, and is electrically connected to the current collector layer 710. For example, the electrical connection member 810 may be mounted on the current collector layer 710 using a spin welding process, and the electrical connection member 810 is electrically connected to the current collector layer 710 through a connection region 815.

In this solution, the electrical connection member 810 is a member configured to conduct an electrode current. The electrical connection member 810 may protrude and extend from an edge of the current collector layer 710, thereby functioning for current input or output.

In some examples, as shown in FIG. 9, at least one side surface (e.g., two side surfaces) of the porous substrate 711 comprises at least one edge region 713, and the conductive layer 712 covers a region outside the edge region 713. Optionally, a part or all of edges of the porous substrate 711 are provided with edge regions. Optionally, for a quadrilateral porous substrate 711, edges of one, two, three, or four sides of the porous substrate 711 are provided with edge regions. Optionally, two opposite edges of the porous substrate 711 are provided with edge regions.

In this solution, the edge region 713 is not covered by the conductive layer 712, and the edge region 713 is partially non-conductive. The edge region 713 is partially not covered by the first active material layer 721 or the second active material layer 722, and the edge region of the current collector layer 710 functions for buffering and protection, to prevent the first active material layer 721 or the second active material layer 722 laminated on the current collector layer 710 from direct contact with an end cap of the battery, thereby functioning for protecting the active material layer. In addition, since the tab 810 is usually installed at an edge of the current collector layer 710, the non-conductive edge region 713 not only functions for protecting the tab 810, but also prevents the tab 810 from occurrence of short circuit because of contacting the opposite electrode.

Figure 10:
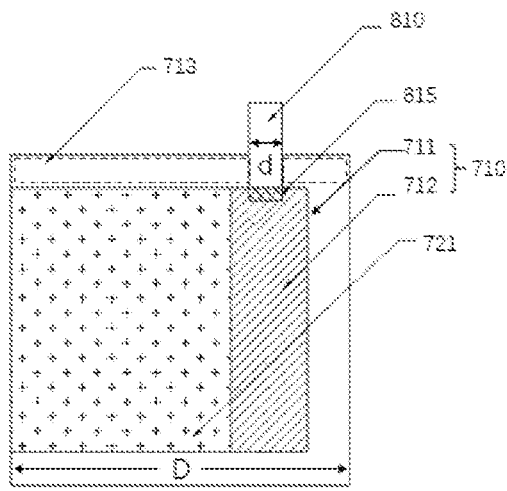
FIG. 10 is a top view of the electrode in some other examples of the present application.
Figure 11:
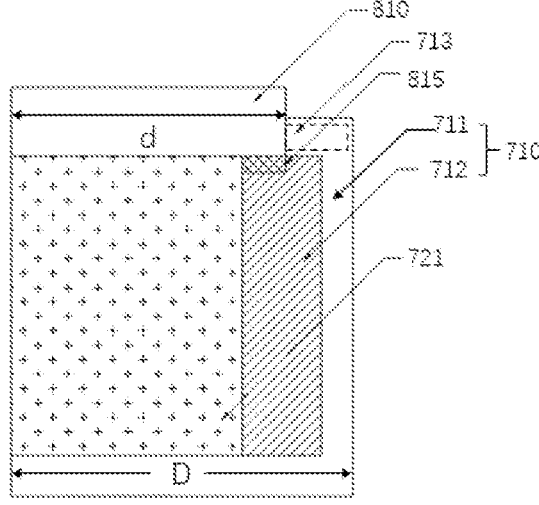
FIG. 11 is a top view of the electrode in some other examples of the present application.

In an example, FIG. 10 and FIG. 11 each show a top view of an electrode. In order to observe layers of the electrodes from the perspective of the top view, in FIG. 10 and FIG. 11, part of surface of the porous substrate 711 is not covered by the conductor layer 712, and part of surface of the current collector layer 710 is not covered by the first active material layer 721. Unless otherwise stated, it should be understood that these uncovered regions are plotted in such a way for ease of viewing. It should be particularly noted that the edge region 713 of the current collector layer 710 is neither partially covered by the conductive layer 712, nor covered by the first active material layer 721 or the second active material layer 722. In this example, the edge region 713 functions for buffering and protection, to prevent the conductive layer 712, the first active material layer 721, or the second active material layer 722 from direct contact with an end cap of the battery.

In some examples, as shown in FIG. 10, a protruding direction perpendicular to the electrical connection member 810 is a first direction, and in the first direction, a ratio d:D of a dimension d of the electrical connection member 810 to a dimension D of the current collector layer 710 may be in a range of 1:2-5. The electrical connection member of the electrode has a small width dimension (d), and has the advantages of simple welding process, small volume, and convenient assembly.

In some examples, FIG. 11 shows a top view of an electrode. As shown in FIG. 11, a protruding direction perpendicular to the electrical connection member 810 is a first direction, and in the first direction, a ratio of a dimension d of the electrical connection member 810 to a dimension D of the current collector layer 710 is d:D=1:1. The electrical connection member of the electrode has a large width dimension (d), thereby reducing an internal resistance at the electrical connection member 810, reducing the Joule heat, and reducing the electrode temperature.

Figure 12:
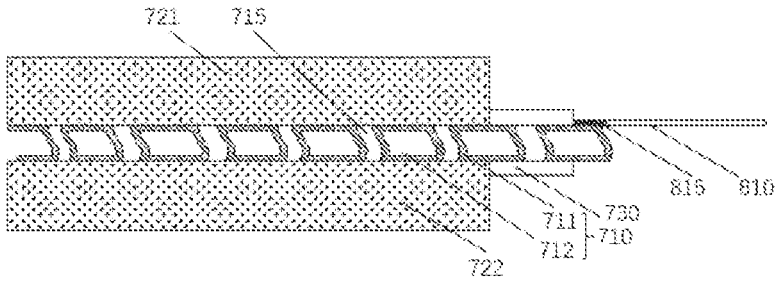
FIG. 12 is a sectional view of the electrode in some other examples of the present application.

In some examples, FIG. 12 shows a sectional view of the electrode in some examples. As shown in FIG. 12, the electrode includes a current collector layer 710. The current collector layer 710 has a porous structure 715, and is gas permeable. The electrode further includes a first active material layer 721 and a second active material layer 722, the first active material layer 721 and the second active material layer 722 are laminated on both side surfaces of the current collector layer 710 respectively, and the first active material layer 721 and the second active material layer 722 are located outside pores of the porous structure 715. The current collector layer 710 comprises a porous substrate 711 and a conductive layer 712, and the conductive layer 712 covers at least part of surface of the porous substrate 711.

In some examples, as shown in FIG. 12, the electrode further comprises an electrical connection member 810 (e.g., a tab). The electrical connection member 810 is mounted on the current collector layer 710, and is electrically connected to the current collector layer 710. For example, the electrical connection member 810 is mounted on the current collector layer 710 using a spin welding process, and the electrical connection member 810 is electrically connected to the current collector layer 710 through a connection region 815.

In some examples, as shown in FIG. 12, the surface of the current collector layer comprises an active material region and a support region; the active material layer is laminated on the active material region of the current collector layer; and the electrode further comprises a support layer laminated on the support region of the surface. In some examples, a material of the support layer comprises porcelain (e.g., a coating comprising porcelain particles).

In this solution, the support layer has a structural strengthening effect. Such a design can improve the structural strength and structural stability of the electrode.

Figure 13:
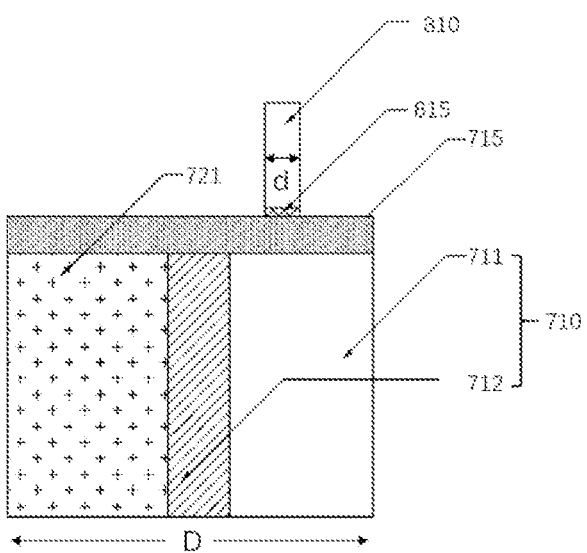
FIG. 13 is a top view of the electrode in some other examples of the present application.
Figure 14:
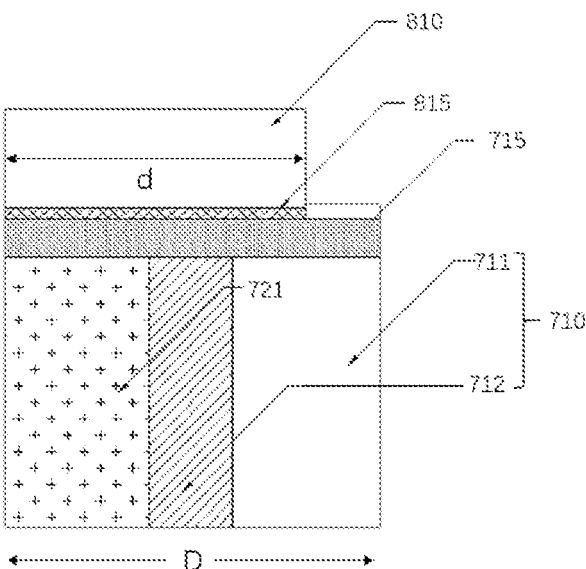
FIG. 14 is a top view of the electrode in some other examples of the present application.

In an example, FIG. 13 and FIG. 14 each show a top view of an electrode. In order to observe layers of the electrodes from the perspective of the top view, in FIG. 13 and FIG. 14, part of surface of the porous substrate 711 is not covered by the conductor layer 712, and part of surface of the current collector layer 710 is not covered by the first active material layer 721. Unless otherwise stated, it should be understood that these uncovered regions are plotted in such a way for ease of viewing.

In some examples, as shown in FIG. 13, a protruding direction perpendicular to the electrical connection member 810 is a first direction, and in the first direction, a ratio d:D of a dimension d of the electrical connection member 810 to a dimension D of the current collector layer 710 is in a range of 1:2-5. The electrical connection member of the electrode has a small width dimension (d), and has the advantages of simple welding process, small volume, and convenient assembly.

In some examples, as shown in FIG. 14, a protruding direction perpendicular to the electrical connection member 810 is a first direction, and in the first direction, a ratio of a dimension d of the electrical connection member 810 to a dimension D of the current collector layer 710 is d:D=1:1. The electrical connection member of the electrode has a large width dimension (d). The electrical connection member 810 has a high conductivity and a low internal resistance, thereby reducing the Joule heat of the electrical connection member, and reducing the electrode temperature.

In some examples, the active material layer comprises an electrochemically active material; where, optionally, the electrochemically active material is selected from a positive electrode active material of a lithium ion battery or a negative electrode active material of the lithium ion battery; optionally, the positive electrode active material of the lithium ion battery is selected from the group consisting of an olivine-structured lithium-containing phosphate, a lithium transition metal oxide, or a combination thereof; and optionally, the negative electrode active material of the lithium ion battery is selected from the group consisting of artificial graphite, natural graphite, soft carbon, hard carbon, silicon-based material, tin-based material, lithium titanate, lithium metal, or a combination thereof. In this solution, the electrode of the present application can be used in combination with various electrochemically active materials.

In some examples, a method for preparing an electrode is provided, including: providing a current collector layer having a porous structure and being gas permeable; providing an active material layer; and laminating the active material layer on at least part of surface of the current collector layer, such that the active material layer is located outside pores of the porous structure. The electrode obtained using this method has an improved gas permeability.

In some examples, the method for preparing an electrode includes a step of preparing the current collector layer, the step including: providing a porous substrate; and depositing a conductive layer on at least part of surface of the porous substrate; where, optionally, the deposition is selected from the group consisting of electroplating, chemical plating, evaporation, magnetron sputtering, or a combination thereof. The electrode obtained using this method has an improved gas permeability.

In some examples, a conductivity of the porous substrate is less than a conductivity of the conductive layer. The electrode obtained using this method has an improved conductivity.

In some examples, a density of the porous substrate is less than a density of the conductive layer. The electrode obtained using this method has a reduced density.

In some examples, a battery is provided, comprising the electrode in the above examples or the electrode prepared using the method in the above examples.

In some examples, an electrical apparatus is provided, comprising the battery in the above examples, where the battery is configured to provide electric energy.

The technical solutions of the present application are described below with reference to more specific examples.

Example 1

An electrode and a method for preparing the same are described below with reference to FIG. 9 and FIG. 10. In an example, the electrode was prepared in accordance with the following method: first, a porous substrate 711, specifically a porous polypropylene (PP) film, was provided. Then, an edge region 713 was demarcated on a surface at an edge of the porous substrate 711. Then, a conductive layer 712 (Al plating or Cu plating) was covered on regions except for the edge region 713. The Al plating may be covered on a surface of the porous polypropylene (PP) film by, e.g., evaporation or chemical vapor deposition (CVD). The Cu plating may be covered on the surface of the porous polypropylene (PP) film by, e.g., magnetron sputtering or chemical plating. A current collector layer 710 was obtained. A layer of conductive network was formed by the conductive layer on the surface of the porous polypropylene film. The current collector layer 710 has a porosity of 35%, a thickness in the range of 30 μm, and a tortuosity of 1.75. An electrical connection member 810 (made of a copper foil/aluminum foil) was mounted on the current collector layer 710 using a conductive adhesive or seam welding, and a ratio of a width d of the electrical connection member 810 to a length D of an electrode sheet was 1:5. A pre-prepared first active material layer 721 (active material film) and a pre-prepared second active material layer 722 (active material film) were used to cover an active material region of the current collector layer 710, and the first active material layer 721 and the second active material layer 722 were fixed on the active material region of the current collector layer 710 using an conductive adhesive in combination with edgewise rolling.

The positive electrode and the negative electrode were prepared respectively in accordance with the above method, then the positive electrode, the negative electrode, and the separator were wound into a cylindrical bare battery cell, and then the battery cell was encapsulated into a battery.

Example 2

Another electrode and a method for preparing the same are described below with reference to FIG. 9 and FIG. 11. Difference from Example 1, a ratio of a width d of an electrical connection member 810 to a length D of an electrode sheet was 1:1.

The positive electrode and the negative electrode were prepared respectively in accordance with the above method, then the positive electrode, the negative electrode, and the separator were wound into a cylindrical bare battery cell, and then the battery cell was encapsulated into a battery.

Example 3

An electrode and a method for preparing the same are described below with reference to FIG. 12 and FIG. 13. In an example, first, a porous substrate 711, specifically a porous polypropylene (PP) film, was provided. Then, a conductive layer 712 (Al plating or Cu plating) was covered on a surface of the porous substrate 711. The Al plating may be covered on a surface of the porous polypropylene (PP) film by, e.g., evaporation or chemical vapor deposition (CVD). The Cu plating may be covered on the surface of the porous polypropylene (PP) film by, e.g., magnetron sputtering or chemical plating. A current collector layer 710 was obtained. A layer of conductive network was formed by the conductive layer on the surface of the porous polypropylene film. The current collector layer 710 has a porosity of 35%, a thickness of 30 μm, and a tortuosity of 1.69. An active material region and a support region were demarcated on the current collector layer 710. A support layer 730 was covered on the support region by coating. The composition of the support layer 730 includes 99 wt % boehmite and 1 wt % PVDF. An electrical connection member 810 (made of a copper foil/aluminum foil) was mounted on the current collector layer 710 using a conductive adhesive or seam welding, and a ratio of a width d of the electrical connection member 810 to a length D of an electrode sheet was 1:5. A pre-prepared first active material layer 721 (active material film) and a pre-prepared second active material layer 722 (active material film) were used to cover an active material region of the current collector layer 710, and the first active material layer 721 and the second active material layer 722 were fixed on the active material region of the current collector layer 710 using an conductive adhesive in combination with edgewise rolling.

The positive electrode and the negative electrode were prepared respectively in accordance with the above method, then the positive electrode, the negative electrode, and the separator were wound into a cylindrical bare battery cell, and then the battery cell was encapsulated into a battery.

Example 4

Another electrode and a method for preparing the same are described below with reference to FIG. 12 and FIG. 14. Difference from Example 3, a ratio of a width d of an electrical connection member 810 to a length D of an electrode sheet was 1:1.

The positive electrode and the negative electrode were prepared respectively in accordance with the above method, then the positive electrode, the negative electrode, and the separator were wound into a cylindrical bare battery cell, and then the battery cell was encapsulated into a battery.

Tests showed that, compared with a battery using a metal foil current collector without a porous structure, the batteries in Examples 1 to 4 exhibited significantly improved performance as follows:

(1) The electrode sheet (especially an electrode sheet located within the battery cell) was faster infiltrated by the electrolyte solution;

(2) The electrode sheet (especially an electrode sheet located within the battery cell) was easier to emit gases generated from a side reaction;

(3) The space utilization of the battery cell was improved; and (4) The manufacturability of the battery cell was improved.

Finally, it should be noted that: the above examples are merely used to illustrate the technical solutions of the present application, instead of imposing any limitation on the present application. Although the present application has been described in detail with reference to the foregoing examples, those with ordinary skills in the art should understand that: the technical solutions disclosed in the foregoing examples may be modified, or a part or all of the technical features thereof may be replaced equivalently. These modifications and replacements are not intended to make the essence of corresponding technical solutions depart from the scope of the technical solutions of examples of the present application, and should be encompassed within the scope of the claims and specification of the present application. In particular, as long as there is no structural conflict, the technical features mentioned in the examples may be combined in any manner. The present application is not limited to the specific examples disclosed herein, but rather includes all technical solutions falling within the scope of the claims.

The invention claimed is:

1. An electrode, comprising:
a current collector layer being gas permeable, a surface of the current collector layer having an active material region and a support region extending from the active material region;
an active material layer laminated on the active material region of the current collector layer;
a support layer laminated on the support region, the supporting layer comprising porcelain, and the support region being not covered by the active material layer; and
an electrical connection member mounted on the current collector layer and electrically connected to the current collector layer through a connection region, the electrical connection member protruding and extending from an edge of the current collector layer and being separated from the active material layer by the support layer;
wherein the current collector layer comprises a porous substrate and a conductive layer, the porous substrate comprises a polymer and having a plurality of pores, the conductive layer comprises a metal, the active material layer is located outside the plurality of pores of the porous substrate, and the conductive layer covers at least part of a surface of the porous substrate and covers at least at part of an inner surface of at least one of the plurality of pores of the porous substrate.

2. The electrode according to claim 1, wherein a conductivity of the conductive layer is greater than a conductivity of the porous substrate.

3. The electrode according to claim 1, wherein a density of the porous substrate is less than a density of the conductive layer.

4. The electrode according to claim 1,
wherein the polymer of the porous substrate is selected from one or more of polyamide, polyimide, polyester, polyolefin, polyyne, siloxane polymer, polyether, polyol, polysulfone, polysaccharide polymer, amino acid polymer, polythiazyl, aromatic ring polymer, heteroaromatic ring polymer, epoxy resin, phenolic resin, derivative thereof, cross-link thereof, copolymer thereof, or a combination thereof.

5. The electrode according to claim 1,
wherein the metal of the conductive layer is selected from the group consisting of aluminum, copper, nickel, iron, titanium, silver, nickel, or an alloy of any one thereof.

6. The electrode according to claim 1, wherein a porosity of the current collector layer is from 20% to 95%.

7. The electrode according to claim 1, wherein a thickness of the current collector layer is from 4 μm to 500 μm.

8. The electrode according to claim 1, wherein a gas permeability of the current collector layer is from 1,000 to 5,000 $cm^3/m^2 \cdot 24$ h·0.1 MPa.

9. The electrode according to claim 1, wherein the active material layer comprises an electrochemically active material.

10. A method for preparing an electrode, comprising:

providing a current collector layer, the current collector layer being gas permeable, a surface of the current collector layer having an active material region and a support region extending from the active material region;

wherein the current collector layer comprises a porous substrate and a conductive layer, the porous substrate comprises a polymer and having a plurality of pores, the conductive layer comprises a metal, and the conductive layer covers at least part of a surface of the porous substrate and covers at least part of an inner surface of at least one of the plurality of pores of the porous substrate;

providing an active material layer, the active material layer is located outside the plurality of pores of the porous substrate;

laminating the active material layer on the active material region of the surface of the current collector layer, such that the active material layer is located outside the plurality of pores of the porous substrate;

laminating a support layer on the support region of the surface of the current collector layer, wherein the support layer comprises porcelain, and the support region is not covered by the active material layer; and mounting an electrical connection member on the current collector layer and electrically connecting the electrical connection member to the current collector layer through a connection region, wherein the electrical connection member protrudes and extends from an edge of the current collector layer and is separated from the active material layer by the support layer.

11. The method according to claim 10, wherein a conductivity of the porous substrate is less than a conductivity of the conductive layer; or a density of the porous substrate is less than a density of the conductive layer.

12. A battery, comprising: the electrode according to claim 1 or the electrode prepared using the method according to claim 10.

13. An electrical apparatus, comprising the battery according to claim 12, wherein the battery is configured to provide electric energy.

14. The electrode according to claim 1, wherein the conductive layer further covers an outer surface of the at least one of the plurality of pores of the porous substrate.

15. The electrode according to claim 1, wherein at least one side surface of the porous substrate comprises at least one edge region, and the conductive layer covers a region outside the at least one edge region, the at least one edge region is not covered by the conductive layer, the at least one edge region is partially non-conductive, and the edge region is at least partially not covered by the active material layer.

16. The electrode according to claim 1, wherein a protruding direction perpendicular to the electrical connection member is a first direction, in the first direction, a ratio of a width dimension d of the electrical connection member to a width dimension D of the current collector layer, denoted as d: D, is in a range of 1:2-5.

17. The electrode according to claim 4, wherein the polymer is selected from one or more of polyamide, polyimide, siloxane polymer, polyether, polyol, polysulfone, polysaccharide polymer, amino acid polymer, polythiazyl, epoxy resin, phenolic resin, or a combination thereof.

18. The electrode according to claim 4, wherein the support layer is coated by a coating comprising boehmite and polyvinylidene fluoride (PVDF).

* * * * *